US008524821B2

(12) United States Patent
Verfaillie

(10) Patent No.: US 8,524,821 B2
(45) Date of Patent: Sep. 3, 2013

(54) GAMMA RADIATION STERILIZABLE, REINFORCED POLYMER COMPOSITION WITH IMPROVED COLOR STABILITY

(75) Inventor: Geert Verfaillie, Parike (BE)

(73) Assignee: Solvay Advanced Polymers, L.L.C., Alpharetta, GA (US)

( * ) Notice: Subject to any disclaimer, the term of this patent is extended or adjusted under 35 U.S.C. 154(b) by 547 days.

(21) Appl. No.: 12/743,349

(22) PCT Filed: Mar. 31, 2008

(86) PCT No.: PCT/EP2008/053835
§ 371 (c)(1),
(2), (4) Date: May 17, 2010

(87) PCT Pub. No.: WO2009/065627
PCT Pub. Date: May 28, 2009

(65) Prior Publication Data
US 2010/0262142 A1    Oct. 14, 2010

Related U.S. Application Data

(60) Provisional application No. 60/989,852, filed on Nov. 23, 2007.

(30) Foreign Application Priority Data

Nov. 23, 2007  (EP) ..................................... 07121414
Dec. 21, 2007  (FR) ..................................... 07 60237

(51) Int. Cl.
    *C08K 3/30* (2006.01)
(52) U.S. Cl.
    USPC ........... 524/420; 524/424; 524/449; 524/451; 524/494
(58) Field of Classification Search
    USPC .......................... 524/420, 447, 449, 451, 494
    See application file for complete search history.

(56) References Cited

U.S. PATENT DOCUMENTS

| 3,936,413 | A |  | 2/1976 | Wurmb et al. |
| 4,847,135 | A |  | 7/1989 | Braus et al. |
| 4,921,896 | A |  | 5/1990 | Bonin et al. |
| 5,124,391 | A |  | 6/1992 | Muehlbach et al. |
| 5,478,878 | A |  | 12/1995 | Nagaoka et al. |
| 2006/0108064 | A1 |  | 5/2006 | Mori |
| 2006/0258789 | A1 |  | 11/2006 | Roland et al. |
| 2007/0003753 | A1 |  | 1/2007 | Asgari |
| 2007/0299171 | A1 | * | 12/2007 | Couillens et al. ............. 524/133 |
| 2010/0036382 | A1 |  | 2/2010 | Bonnadier |

FOREIGN PATENT DOCUMENTS

| EP | 1466944 A1 | 10/2004 |
| JP | 01156364 A | 6/1989 |
| JP | 2001115012 | 4/2001 |
| JP | 2002294070 | 10/2002 |
| JP | 2007218980 A | 8/2007 |
| WO | WO 9927387 A1 | 6/1999 |
| WO | WO 2004036661 A2 | 4/2004 |
| WO | WO 2005012412 A1 | 2/2005 |

OTHER PUBLICATIONS

[Unknown Author] Wikipedia "Scintillator", Database Wikipedia online, Apr. 22, 2008, retrieved from http://en.wikipedia.org/wiki/scintillator—XP002478139, 1 pg.
[Unknown Author] Cerac Incorporated "Cirom-2 Zinc Sulfide", Database Cerac Incorporated online, Williams Advanced Materials, Jul. 10, 2007, retrieved from http://www.cerac.com/pubs/proddata/zns.pdf—XP002478140; 2 pgs.
[Unknown Author] MDS Nordion "Gamma Radiation Sterilization : Effects on Medical Devices", retrieved from the Internet on Nov. 16, 2006 via http://www.nordion.com/documents/elibrary/research-articles/EffectsofGammaonMedicalDevices.PDF, 7 pgs.
McIlvaine Josh, "The effect of gamma sterilization on the color and mechanical properties of glass reinforced and lubricated thermoplastics" published by the Society of Plastics Engineers in its Annual Technical Conference 1995 ANTEC '95, pp. 3346-3349; 6 pgs.
[Unknown Author ] Solvay Advanced Polymers LLC "Plastics for Healthcare" retrieved from the Internet on Apr. 13, 2010 via http://www.solvayadvancedpolymers.com/markets/markethealthcare/ ; 4 pgs.
Hohenberger W., "Fillers", Plastics Additives Handbook, 2001, 5th edition, Hanser, Chapter 17.4.2 "Platy fillers", p. 926 to 930; Chapter 17.4.3.1. "Wollastonite", p. 930-931; Chapter 17.4.3.2. "Whiskers", p. 931 and Chapter 17.4.3.3. "Glass fibers", p. 931-934, Hanser Gardner Publications; 7 pgs.
Otsu N. "A Threshold Selection Method from Gray-Level Histograms", IEEE Transactions on Systems, Man and Cybernetics, Jan. 1979, vol. 9(1), p. 62-66.
Murphy J. "Glass fibers", Additives for Plastics Handbook, 2001, 2nd edition, Chapter 5.2.3, p. 43-48; 8 pgs.
Heinrich H. et al. "Pigments, Inorganic", Ullmann's Encyclopedia of Industrial Chemistry, 1992, 5th edition, vol. A 20, p. 257-290, Wiley-VCH editor; 39 pgs.
Weast R.C. et al. "Physical properties of pigments" in "CRC Handbook of Chemistry and Physics", 1989-1990, 70th edition, p. F-67 to F-69, CRC Press Inc., Boca Raton, Florida.
[Unknown Author] "Refractive index and Mohs hardness for a wide variety of minerals and pigments" provided in the database at the Internet address http://www.mindat.org/; retrieved online on Apr. 13, 2010 ; 3 pgs.
[Unknown Author] USP, "Biological reactivity tests, in vivo", The United States Pharmacopeia, The National Formulary, Jan. 1, 2006, p. 2526-2530.

* cited by examiner

*Primary Examiner* — Edward Cain
(74) *Attorney, Agent, or Firm* — Maryam Momtaz

(57) ABSTRACT

Gamma radiation sterilizable, reinforced polymer composition (C) comprising:
at least one semi-aromatic polyamide (PA),
at least one filler (F) selected from platy fillers, acicular fillers and fibrous fillers, and
at least one inorganic pigment (IP) having a Mohs hardness of at most 4.5 and a refractive index of at least 1.70.

15 Claims, No Drawings

GAMMA RADIATION STERILIZABLE, REINFORCED POLYMER COMPOSITION WITH IMPROVED COLOR STABILITY

CROSS-REFERENCE TO RELATED APPLICATIONS

This application is a U.S. national stage application under 35 U.S.C. §371 of International Application No. PCT/EP2008/053835 filed Mar. 31, 2008, which claims the benefit of U.S. provisional application No. 60/989,852 filed Nov. 23, 2007, of European patent application No. 07121414.2 filed Nov. 23, 2007, and of French patent application No. 0760237 filed Dec. 21, 2007, the whole content of all three applications being herein incorporated by reference for all purposes.

The present invention relates to a gamma radiation sterilizable, reinforced polymer composition comprising a semi-aromatic polyamide. More specifically, the present invention relates to a polymer composition comprising such a semi-aromatic polyamide which features improved color stability after exposure to gamma-radiation sterilization. The invention also relates to shaped articles or parts of shaped articles made of said composition, in particular gamma radiation sterilized medical devices. The invention also relates to the use of certain pigments for stabilizing the color of gamma radiation a sterilized polymer composition.

High performance polymers are widely used for many high-demanding applications, in particular in many components used in medical applications, more particularly for the manufacture of medical devices which are submitted to sterilization by gamma radiation. Certain polymers usable in this market, their advantages and drawbacks have been listed and detailed by MDS Nordion in a paper entitled "Gamma Radiation Sterilization: Effects on Medical Devices" viewable on its Web site (http://www.nordion.com/documents/elibrary/research-articles/EffectsofGammaonMedicalDevices.PDF), the whole content of which is herein incorporated by reference. This paper teaches notably that high levels of antioxidants help radiation stability, and that it may be needed to increase the level if the product is to be radiation stabilized; however, phenolic-type antioxidants in polymer should be avoided or minimized. It teaches also that a coloring agent such as ultramarine blue, a blue pigment the refractive index of which is 1.50 and the Mohs hardness of which is 5-5.5, may be used to mask (emphasis added on the term "mask") the yellowing due to irradiation. On the other hand, this document keeps silent about any possible stabilization effect against gamma radiation that would result from the use of certain particular pigments as those involved in the present invention, from which ultramine blue differs with respect of both the refractive index and the Mohs hardness.

Semi-aromatic polyamides (like those derived from aromatic diamines and aliphatic diacids) are polymers having excellent mechanical, physical and chemical properties which make them useful for certain medical devices and tools. Hence, for instance, instruments and ancillaries used to remove bones for hip or knee prosthetic surgery comprising a semi-aromatic polyamide, essentially all the recurring units of which are obtained by the polycondensation reaction of adipic acid with meta-xylylene diamine (PMXD6) have been disclosed in US provisional specification No. 60/871,840 filed on Dec. 26, 2006, the whole content of which is herein incorporated by reference.

High performance polyarylamides commercialized under the trade name IXEF® by Solvay Advanced Polymers, L.L.C. are also proposed for the manufacture of products for healthcare, like medical devices (see Web site http://www.solvay-advancedpolymers.com/markets/markethealthcare/)

These semi-aromatic polyamides suffer, however, from a serious drawback when they are used for the manufacture of medical devices which have to be sterilized by using gamma radiation. Actually, the exposition of medical devices, containing these polyamides, to the effect of gamma radiation induces a distinct and visually noticeable color change, especially dramatic color shifts in natural and light shade compositions. This is particularly cumbersome for the appearance of medical devices molded from such compositions which are visible to the consumer.

Applicants have no knowledge of effective proposals which would have been made to cope with the problem of color change of semi-aromatic polyamides-based molding compositions, when exposed to the degradative effect of gamma rays. For instance, in Josh McIlvaine's article entitled "The effect of gamma sterilization on the color and mechanical properties of glass reinforced and lubricated thermoplastics" published by the Society of Plastics Engineers in its Annual Technical Conference 1995 (ANTEC '95, pages 3346-3349), it is merely stated that "Most thermoplastics experience a color shift after exposure to gamma radiation" and that "Pigment systems and glass fiber have a significant impact on the color stability of thermoplastic compounds after sterilization" (page 3347, left column, last full paragraph). While it is also broadly stated in this article (page 3347, Conclusions, last but one paragraph) that "equally important is selecting the proper filler and pigment which will minimize the color shift to significant surfaces", no precise teaching addresses the specific problem of color change of molding compositions based on polyamides derived for instance from aromatic diamines and aliphatic diacids, when these compositions are exposed to gamma rays sterilization.

From the foregoing discussion, it results that further research was thus needed in order to improve the color stability of gamma radiation sterilized compositions based on semi-aromatic polyamides, while maintaining their mechanical properties.

In particular, it is an objective of the invention to provide a gamma radiation sterilizable semi-aromatic polyamide composition, wherein said composition, besides featuring excellent color stability when exposed to gamma radiation, would also retain its outstanding mechanical properties.

The invention therefore provides a gamma radiation sterilizable, reinforced polymer composition (C) comprising:
- at least one semi-aromatic polyamide (PA),
- at least one filler (F) selected from platy fillers, acicular fillers and fibrous fillers, and
- at least one inorganic pigment (IP) having a Mohs hardness (H) of at most 4.5 and a refractive index (n) of at least 1.70.

As mentioned, the composition (C) in accordance with the invention comprises at least one semi-aromatic polyamide (PA). For the purpose of the present description, the term "semi-aromatic polyamide" should be understood as defining any polymer which comprises recurring units obtainable by (and preferably, obtained by) the polycondensation reaction between at least one non-aromatic diacid (or derivatives thereof) and an aromatic diamine, and/or recurring units obtainable by (and preferably, obtained by) the polycondensation reaction between an aromatic diacid (or derivatives thereof) and at least one non-aromatic diamine.

A diacid (or derivative thereof) or a diamine is considered for the purpose of this invention as "aromatic" when it comprises one or more than one aromatic group. A diacid (or derivative thereof) or a diamine or an amino-carboxylic acid (or derivative thereof) is considered for the purpose of this invention as "non-aromatic" when it is free from aromatic group.

Very preferably, the semi-aromatic polyamide (PA) comprises recurring units obtainable by (and preferably, obtained by) the polycondensation reaction between an aromatic diamine and an aliphatic diacid (or derivatives thereof) and/or recurring units obtainable by (and preferably, obtained by) the polycondensation reaction between an aromatic diacid (or derivatives thereof) and an aliphatic diamine.

A first class of semi-aromatic polyamides (PA) are semi-aromatic polyamides (PA1) comprising more than 50 mole % of recurring units obtainable by (and preferably, obtained by) the polycondensation reaction between at least one aliphatic diacid or derivative thereof and at least one aromatic diamine; preferably more than 75 mole % and more preferably more than 85 mole % of said recurring units can be obtained (and preferably, are obtained) by the polycondensation reaction between at least one aliphatic diacid or derivative thereof and at least one aromatic diamine. Still more preferably, essentially all or even all the recurring units of the semi-aromatic polyamides (PA1) can be obtained (and preferably, are obtained) by the polycondensation reaction between at least one aliphatic diacid or derivative thereof and at least one aromatic diamine.

The term diacid derivative is intended to encompass acid halogenides, especially chlorides, acid anhydrides, acid salts, acid amides and the like, which can be advantageously used in the polycondensation reaction.

The expression "at least one aliphatic diacid or derivative thereof" and "at least one aromatic diamine" are understood to mean that one or more than one aliphatic diacid or derivative thereof and one or more than one aromatic diamine can be made to react as above specified.

Non limitative examples of aromatic diamines are notably m-phenylene diamine (MPD), p-phenylene diamine (PPD), 3,4'-diaminodiphenyl ether (3,4'-ODA), 4,4'-diaminodiphenyl ether (4,4'-ODA), m-xylylenediamine (MXDA), as shown below:

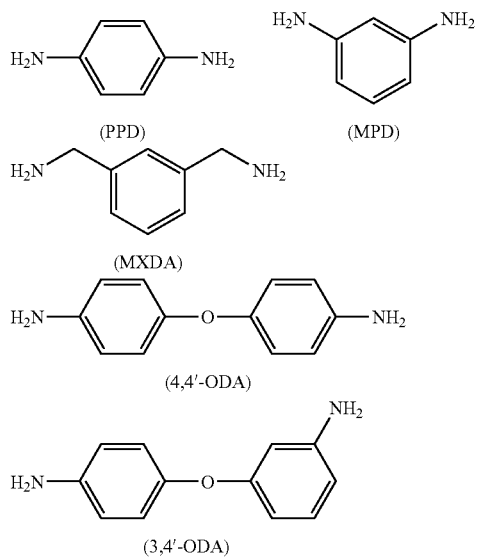

(PPD) (MPD)

(MXDA)

(4,4'-ODA)

(3,4'-ODA)

and p-xylylenediamine (PXDA, not represented)

The aromatic diamine is preferably m-xylylenediamine (MXDA).

Non limitative examples of aliphatic diacids are notably oxalic acid (HOOC—COOH), malonic acid (HOOC—CH$_2$—COOH), succinic acid [HOOC—(CH$_2$)$_2$—COOH], glutaric acid [HOOC—(CH$_2$)$_3$—COOH], 2,2-dimethyl-glutaric acid [HOOC—C(CH$_3$)$_2$—(CH$_2$)$_2$—COOH], adipic acid [HOOC—(CH$_2$)$_4$—COOH], 2,4,4-trimethyl-adipic acid [HOOC—CH(CH$_3$)—CH$_2$—C(CH$_3$)$_2$—CH$_2$—COOH], pimelic acid [HOOC—(CH$_2$)$_5$—COOH], suberic acid [HOOC—(CH$_2$)$_6$—COOH], azelaic acid [HOOC—(CH$_2$)$_7$—COOH], sebacic acid [HOOC—(CH$_2$)$_8$—COOH], undecanedioic acid [HOOC—(CH$_2$)$_9$—COOH], dodecanedioic acid [HOOC—(CH$_2$)$_{10}$—COOH], tetradecanedioic acid [HOOC—(CH$_2$)$_{11}$—COOH].

The aliphatic diacid is preferably adipic acid.

As above mentioned, such aliphatic diacids can be used in the polycondensation reaction notably under the form of free acid and acid chloride.

Good results are obtained when using PMXD6 polymers as the semi-aromatic polyamide (PA1).

For the purpose of the present invention, a PMXD6 polymer is intended to denote a semi-aromatic polyamide essentially all, if not all, the recurring units of which are obtainable by (and preferably, obtained by) the polycondensation reaction of adipic acid with meta-xylylene diamine.

PMXD6 polymers are notably commercially available as IXEF® polyamides from Solvay Advanced Polymers, L.L.C.

The molecular weight of the PMXD6 polymer is not particularly limited. The PMXD6 has advantageously a number average molecular weight ($M_n$) of at least 2,500, more preferably of at least 5,000, more preferably of at least 10,000 and still more preferably of at least 13,000. In addition, the PMXD6 has advantageously a number average molecular weight ($M_n$) of at most 60,000, more preferably of at most 50,000 and still more preferably of at most 30,000.

$M_n$ can be calculated according to the following formula:

$$M_n = 2 \times 10^6 / \Sigma(\text{—COOH end groups}) + (\text{—NH2 end groups})$$

(—COOH end groups)=number of acid end groups in μequivalents/gram of product resin (titrated with a base)
(—NH2 end groups)=number of basic end groups in μequivalents/gram of product resin (titrated with an acid).

For the purpose of the present invention, it should be understood that the definition "semi-aromatic polyamides (PA1)" also encompasses polyamides comprising less than 50 mole %, preferably less than 25 mole % and more preferably less than 15 mole % of recurring units obtainable by (and preferably, obtained by) the polycondensation reaction between at least one aliphatic diacid or derivative thereof, as above specified, and at least one aliphatic diamine. In this particular embodiment, said at least one aliphatic diamine may be a comonomer used in conjunction with one of the aromatic diamines as specified above. Said aliphatic diamine may be selected, for instance, among 1,2-diaminoethane, 1,2-diaminopropane, propylene-1,3-diamine, 1,3-diaminobutane, 1,4-diaminobutane, 1,5-diaminopentane, 1,6-hexanediamine or hexamethylenediamine (HMDA), 1,8-diaminooctane, 1,10-diaminodecane, 1,12-diaminododecane, 1-amino-3-N-methyl-N-(3-aminopropyl)-aminopropane. A preferred aliphatic diamine is hexamethylenediamine (HMDA).

Another class of semi-aromatic polyamides (PA) are semi-aromatic polyamides (PA2) comprising more than 50 mole % of recurring units obtainable by (and preferably, obtained by) the polycondensation reaction between at least one aromatic diacid or derivative thereof and at least one aliphatic diamine.

The expression "at least one aromatic diacid or derivative thereof" and "at least one aliphatic diamine" are understood to mean that one or more than one aromatic diacid or derivative thereof and one or more than one aliphatic diamine can be made to react as above specified.

Non limitative examples of aliphatic diamines are notably 1,2-diaminoethane, 1,2-diaminopropane, propylene-1,3-diamine, 1,3-diaminobutane, 1,4-diaminobutane, 1,5-diaminopentane, 1,6-hexanediamine or hexamethylenediamine (HMDA), 1,8-diaminooctane, 1,10-diaminodecane, 1,12-diaminododecane, 1-amino-3-N-methyl-N-(3-aminopropyl)-aminopropane.

Preferred aliphatic diamine is hexamethylenediamine (HMDA).

Aromatic diacids and derivative thereof employed in the polycondensation reaction to yield the semi-aromatic polyamides (PA2) are not particularly restricted. Non limitative examples of aromatic diacids are notably phthalic acids, including isophthalic acid (IPA), terephthalic acid (TPA) and orthophthalic acid (OPA), naphthalenedicarboxylic acids, 2,5-pyridinedicarboxylic acid, 2,4-pyridinedicarboxylic acid, 3,5-pyridinedicarboxylic acid, 2,2-bis(4-carboxyphenyl)propane, bis(4-carboxyphenyl)methane, 2,2-bis(4-carboxyphenyl)hexafluoropropane, 2,2-bis(4-carboxyphenyl)ketone, 4,4'-bis(4-carboxyphenyl)sulfone, 2,2-bis(3-carboxyphenyl)propane, bis(3-carboxyphenyl)methane, 2,2-bis(3-carboxyphenyl)hexafluoropropane, 2,2-bis(3-carboxyphenyl)ketone, bis(3-carboxyphenoxy)benzene.

Preferably, the semi-aromatic polyamides (PA2) are polyphthalamides, i.e. aromatic polyamides of which more than 50 mole % of the recurring units are obtainable by (and preferably, obtained by) the polycondensation reaction between at least one phthalic acid, chosen among IPA, TPA and PA, or derivative thereof, and at least one aliphatic diamine.

For the avoidance of doubt, chemical structures of IPA, TPA, PA are depicted herein below:

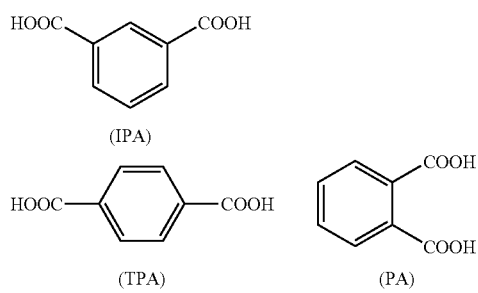

(IPA)

(TPA)

(PA)

Suitable polyphthalamides are notably available as AMODEL® polyphthalamides from Solvay Advanced Polymers, L.L.C.

The semi-aromatic polyamides (PA2) may be chosen from poly(tere/iso)phthalamides.

For the purpose of the present invention, poly(tere/iso)phthalamides are defined as aromatic polyamides of which:
(i) more than 50 mole % of the recurring units are formed by the polycondensation reaction between terephthalic acid, isophthalic acid and at least one aliphatic diamine;
(ii) more than 25 and up to 50 mole % of the recurring units are formed by the polycondensation reaction between terephthalic acid and at least one aliphatic diamine; and
(iii) from 1 to 25 mole % of the recurring units are formed by the polycondensation reaction between isophthalic acid and at least one aliphatic diamine.

Poly(tere/iso)phthalamides may further comprise recurring units formed by the polycondensation reaction between at least one aliphatic diacid and at least one aliphatic diamine. In addition, poly(tere/iso)phthalamides are preferably free of recurring units formed by the polycondensation reaction between (ortho)phthalic acid (PA) and at least one diamine (aliphatic or aromatic).

The semi-aromatic polyamides (PA2) may also be chosen from polyterephthalamides.

For the purpose of the present invention, polyterephthalamides are defined as aromatic polyamides of which more than 50 mole % of the recurring units are formed by the polycondensation reaction between terephthalic acid and at least one aliphatic diamine.

A first class of polyterephthalamides consists of polyterephthalamides essentially all, if not all, the recurring units of which are formed by the polycondensation reaction between terephthalic acid and at least one aliphatic diamine [class (I)].

A second class of polyterephthalamides consists of polyterephthalamides essentially all, if not all, the recurring units of which are formed by the polycondensation reaction between terephthalic acid, isophthalic acid and at least one aliphatic diamine [class (II)].

A third class of polyterephthalamides consists of polyterephthalamides essentially all, if not all, the recurring units of which are formed by the polycondensation reaction between terephthalic acid, at least one aliphatic diacid and at least one aliphatic diamine [class (III)]. Such recurring units are respectively referred to as terephthalamide and aliphatic acid-amide recurring units.

Within class (III), a subclass consists of polyterephthalamides in which the mole ratio of the terephthalamide recurring units based on the total number of moles of the recurring units (i.e. the terephthalamide plus the aliphatic acid-amide recurring units) is 60 mole % or more; in addition, it is advantageously 80 mole % or less, and preferably 70 mole % or less [subclass (III-1)].

Within class (III), a second subclass consists of polyterephthalamides in which the mole ratio of the terephthalamide recurring units based on the total number of moles of the recurring units (i.e. the terephthalamide plus the aliphatic acid-amide recurring units) is less than 60 mole % [subclass (III-2)].

A fourth class of polyterephthalamides consists of polyterephthalamides essentially all, if not all, the recurring units of which are formed by the polycondensation reaction between terephthalic acid, isophthalic acid, at least one aliphatic diacid and at least one aliphatic diamine [class (IV)].

Aliphatic acids and aliphatic amines useful for classes (I) to (IV) are those above described as suitable for polymers (PA1) and (PA2).

Among all semi-aromatic polyamides (PA) described here above, semi-aromatic polyamides (PA1) are often preferred as components of the polymer composition (C) in accordance with the invention. PMXD6 polymers are especially preferred as the semi-aromatic polyamide (PA).

According to one further particular embodiment of the invention, at least one another polyamide (PA3) may optionally be incorporated into polymer composition (C) in addition to the semi-aromatic polyamide (PA). In one aspect of this particular embodiment, said polyamide (PA3), distinct from the semi-aromatic polyamide (PA), may be selected from the whole of the semi-aromatic polyamides (PA) described above themselves. In another aspect of this particular embodiment, which is preferred, the at least one other polyamide (PA3) is selected among aliphatic polyamides. For the purpose of the present invention, the definition "aliphatic polyamide" is intended to denote any polyamide more than 50 mole %, preferably more than 75 mole % and more preferably more than 85 mole % of the recurring units of which are obtainable by (and preferably, obtained by) the polycondensation reaction between an aliphatic diacid (and/or a derivative thereof) and an aliphatic diamine, and/or by the auto-polycondensation reaction of an amino carboxylic acid and/or a lactam. Aliphatic diacids and aliphatic diamines are those above described as suitable for polymers (PA1) and (PA2).

Preferably, essentially all or even all the recurring units of the aliphatic polyamide (PA3) are obtainable by (and preferably, obtained by) the polycondensation reaction between at least one aliphatic diacid or derivative thereof and at least one aliphatic diamine.

More preferably, the aliphatic polyamide (PA3) is chosen from poly(hexamethylene adipamide) (nylon 66), poly(hexamethylene azelaamide) (nylon 69), poly(hexamethylene sebacamide) (nylon 610), poly(hexamethylene dodecanoamide) (nylon 612), poly(dodecamethylene dodecanoamide) (nylon 1212) and their copolymers. Examples of polyamides obtainable by (and preferably, obtained by) the auto-polycondensation reaction of an amino carboxylic acid and/or a lactam are the polycaprolactame (nylon 6), the polycaproamide and the poly(11-amino-undecano-amide).

More preferably, the aliphatic polyamide (PA3) is chosen from nylon 6 and nylon 66.

Still more preferably, the aliphatic polyamide (PA3) is nylon 66, i.e. the polyamide obtainable by (and preferably, obtained by) the polycondensation reaction between 1,6-hexamethylenediamine and adipic acid.

The semi-aromatic polyamide (PA) is generally contained in the polymer composition (C) in an amount of at least 10 wt. %, preferably at least 25 wt. %, more preferably at least 35 wt. % and still more preferably at least 40 wt. %, based on the total weight of the polymer composition (C). Besides, the semi-aromatic polyamide (PA) is contained in the polymer composition (C) in an amount of generally at most 95 wt. %, preferably at most 80 wt. %, more preferably at most 60 wt. % and still more preferably at most 50 wt. %, based on the total weight of the polymer composition (C).

If present, the polyamide (PA3) is contained in the polymer composition in an amount of advantageously at least 3 wt. %, preferably at least 6 wt. %, more preferably at least 10 wt. %, based on the weight of the semi-aromatic polyamide (PA). Besides, the highest amount of polyamide (PA3) which is optionally contained in the polymer composition may reach about 300 wt. %, preferably about 250 wt. %, based on the weight of the aromatic polyamide (PA).

The polymer composition (C) in accordance with the invention comprises at least one filler (F) selected from platy fillers, acicular fillers and fibrous fillers.

Any filler (F) as above defined is in principle desirable for use in the present invention; fillers known for being profitably incorporated into a polyamide matrix will be advantageously used. The skilled person will easily recognize the filler (F) which fits best for the polymer composition (C). Generally, the filler (F) is chosen depending on its chemical nature, its number average length, its number average diameter, its number average aspect ratio, its ability to feed nicely in compounding equipment without bridging and surface treatment (notably because good interfacial adhesion between the filler and the polyamide improves the stiffness and the toughness of the blend).

The filler (F) is generally a reinforcing filler. Reinforcing fillers are well known by the skilled in the art. Reinforcing fillers, when blended with the semi-aromatic polyamide (PA), typically in an amount from 10 to 50 phr (e.g. 30 phr), form a blend having a tensile strength which is higher than that of the neat semi-aromatic polyamide (PA). The tensile strength can be measured on 3.2 mm (0.125 in) thick ASTM test specimens in accordance with ASTM D-638. Platy fillers, acicular fillers and fibrous fillers are generally reinforcing fillers, and can often provide a high increase in the tensile strength of the semi-aromatic polyamide.

Platy fillers are well known by the skilled in the art. Typically, platy fillers consist essentially of, or even consist of, particles having the shape of, or resembling to a plate, i.e. the particles are flat or nearly flat and their thickness is small in comparison with the other two dimensions. Certain platy fillers are notably described in chapter 17.4.2, p. 926 to 930 of Plastics Additives Handbook, $5^{th}$ edition, Hanser, the whole content of which is herein incorporated by reference. Non limitative examples of platty fillers include talc (n=1.57-1.69, H=1), micas such as muscovite mica (n=1.55-1.61; H ranges from 2.5 to 4) and phlogopite mica (n=1.54-1.69, H=2.5-3), kaolins such as kaolinite (n=1.56-1.61, H=2), calcinated kaolin or mullite (n=1.62, H ranges from 6 to 8, depending on the calcination temperature), and clay such as Bali clay (n=1.6, H=2-2.5).

Acicular fillers are also well known by the skilled in the art. Typically, acicular fillers consist essentially of, or even consist of, particles having the shape of, or resembling to a needle. The particles of acicular fillers, as contained in the polymer composition (C), have typically a number average ratio of between 2 and 20. Notably to the purpose of achieving an increased reinforcing effect, the number average ratio of the particles as contained in the polymer composition (C), is preferably of at least 3.0, more preferably at least 4.5, still more preferably at least 6.0; when high dimensional stability and low warpage are needed, the number average ratio is preferably of at most 15. The number average aspect ratio of the particles of a filler can be determined by optical microscopy coupled with an image analysis software. To this purpose, the particles are advantageously finely dispersed in a solvent such as ethanol. The magnification ranges generally from about 200 to about 400. The image analysis software can be based on Otsu's method as described in "A Threshold Selection Method from Gray-Level Histograms", IEEE Trans. Syst. Ma, Cybern., 9, 62-66 (1979), the whole content of which is herein incorporated by reference. The number average aspect ratio can be defined as the number average of the aspect ratios of each particle taken individually, and the aspect ratio of a particle can be defined as its length over diameter ratio. The length of a particle can be defined as the length of the major axis of the ellipse having the same normalized second order moment as the particle, while the diameter of the particle can be defined as the length of the minor axis of the ellipse having the same normalized second order moment as the particle.

Among acicular fillers, wollastonite (n=1.65, H=4.5-5) and xonotlite (n=1.59, H=6.5) are preferred. Wollastonite is a white calcium metasilicate with good resistance to alkalis; wollastonite is notably described in chapter 17.4.3.1, p. 930 to 931 of Plastics Additives Handbook, $5^{th}$ edition, Hanser, the whole content of which is herein incorporated by reference. Xonotlite is an inosilicate; typically, its formula is $Ca_6Si_6O_{17}(OH)_2$. Other acicular fillers suitable for the purpose of the present invention include sepiolite, attapulgite and palygorskite.

Finally, fibrous fillers are also well known by the skilled in the art. Typically, fibrous fillers consist essentially of, or even consist of, particles having the shape of, or resembling to a fiber, i.e. the particles are slender and greatly elongated, and their length is very high in comparison with the other two dimensions. Notably to the purpose of increased reinforcement, the particles of fibrous fillers, as contained in the polymer composition (C), have:
- a number average ratio which is typically above 5, preferably above 10 and more preferably above 15;
- a number average length which typically of at least 50 μm, preferably at least 100 μm and more preferably at least 150 μm; and
- a number average diameter which is typically below 25 μm, preferably below 20 μm, and more preferably below 15 μm.

As contained in the polymer composition (C), the particles of fibrous fillers have a number average length generally below 30 mm, and a number average diameter generally above 3 μm. Certain fibrous fillers are notably described in chapters 17.4.3.2 and 17.4.3.3, p. 930 to 931 of Plastics Additives Handbook, $5^{th}$ edition, Hanser, the whole content of which is herein incorporated by reference. Among fibrous fillers usable in accordance with the present invention, glass fiber, asbestos, synthetic polymeric fiber, aramid fiber, aluminum fiber, titanium fiber, magnesium fiber, aluminum silicate fiber, silicium carbide fibers, boron carbide fibers, rock wool fiber, steel fiber etc. can be cited. As can be seen, A particular class of fibrous fillers consists of whiskers, i.e. single crystal fibers made from various raw materials, such as $Al_2O_3$, SiC, BC, Fe and Ni. Among fibrous fillers, glass fibers are preferred; they include chopped strand A-, E-, C-, D-, S- and R-glass fibers, as described in chapter 5.2.3, p. 43-48 of Additives for Plastics Handbook, $2^{nd}$ edition, John Murphy, the whole content of which is herein incorporated by reference. Depending on their type, glass fibers have a refractive index n of from about 1.51 to about 1.58, and a Mohs hardness H of 6.5.

Preferably, the filler (F) is chosen from acicular fillers and fibrous fillers. Good results are obtained with wollastonite.

Very preferably, the filler (F) is chosen from fibrous fillers. Excellent results are obtained with glass fibers.

The filler (F) is generally not black (an example of a black fibrous filler is carbon fiber; an example of a black platy filler is graphite). The filler (F) has preferably a refractive index n of at least 1.40, and preferably at least 1.50.

The filler (F) has advantageously a Mohs hardness H of advantageously at least 2.5, preferably at least 4.5 and more preferably at least 6. Besides, the difference between the Mohs Hardness H of the filler (F) and the Mohs hardness H of the inorganic pigment (IP) [$H_{filler\ (F)} - H_{pigment\ (IP)}$] is advantageously of at least +1, preferably at least +2 and more preferably at least +3.

The filler (F) is preferably coated with a sizing. The sizing includes preferably a polyamide.

Good results are obtained when the filler (F) is a chopped strand glass fiber with a polyamide sizing.

The filler (F) is generally contained in the polymer composition (C) in an amount of at least 10 wt. %, preferably at least 20 wt. %, more preferably at least 30 wt. % and still more preferably at least 40 wt. %, based on the weight of the polymer composition (C). Besides, the filler (F) is generally contained in the polymer composition in an amount of at most 60 wt. %, preferably at most 55 wt. %, and more preferably at most 52 wt. %, based on the weight of the polymer composition (C).

As mentioned, the composition (C) in accordance with the invention comprises at least one inorganic pigment (IP). As stated, it is necessary that said inorganic pigment features a refractive index (n) of at least 1.70. Preferably, said inorganic pigment features a refractive index n of at least 1.90, more preferably of at least 2.10 and still more preferably of at least 2.30. While this does not represent a preferred feature of the inorganic pigment (IP), it can be noted that the refractive index (n) the inorganic pigment (IP) is generally below 4.00, very often below 3.50 and often below 3.00.

For the purpose of the present description, the refractive index (n) of a substance, such as the filler (F) or the inorganic pigment (IP), is intended to define the refractive index of this substance, measured at a wavelength of a light ray emitted between 550 and 590 nanometers (nm). Such light ray may be emitted for instance by a laser device. The yellow light emitted by the D line of a sodium ions source, at a wavelength of 589 nm, is often used to measure the n of the substance, in particular the filler (F) or the inorganic pigment (IP). Values for the refractive index of a substance are generally provided with the second decimal. Yet, it is not critical for the skilled person exploiting the present invention to be able to measure the refractive index n with such a high accuracy, given the sensitivity of the properties of the composition, in particular its gamma ray resistance, to the refractive index. The above indications, which are by far sufficient to measure the refractive index n with an accuracy of about +/−0.05, are also by far sufficient for the skilled in the art to discriminate in a sufficiently clear and complete manner, among all inorganic pigments, those which are suitable for use in the polymer composition (C) of the present invention. The values of refractive index cited in the present application can be used as the primary source of reference values for the purpose of the present invention. The values of refractive index provided in pages F-67 to F-69 of CRC Handbook of Chemistry and Physics, $70^{th}$ edition, 1989-1990, for a wide range of inorganic pigments can be used as another source of reference values for the purpose of the present invention; unless otherwise indicated, all refractive index measurements cited in the CRC Handbook of Chemistry were made by sodium light. When no value is cited either in the present specification or is available in the CRC Handbook of Chemistry for a given pigment, it can be relied upon the refractive index valued provided at http://www.mindat.org/ for a wide variety of minerals and pigments.

It should be emphasized, however, that it is not enough for the pigment (IP) to comply with the above mentioned refractive index requirement to fulfill the requisites of the present invention. In accordance with the present invention, pigment (IP) should also feature a Mohs hardness H of at most 4.5, preferably of at most 4, more preferably of at most 3.5, and the most preferably of at most about 3.

For the purpose of the present description, the "Mohs hardness" (also named "Mohs index") of a substance, in particular an inorganic pigment (P) or a filler (F), is intended to define the hardness H of the substance on the well known scale of mineral hardness which characterizes the scratch resistance of various minerals through the ability of a harder material to scratch a softer material. According to this purely ordinal and not linear scale, integer number 1 is assigned to the softest mineral (talc) and integer number 10 is assigned to the hardest mineral (diamond). The hardness of a material is measured against the scale by finding the hardest material that the given material can scratch, and/or the softest material that can scratch the given material. The Mohs hardness H has been tabulated for most solid materials. The results of the Mohs test are typically provided with an accuracy of +/−0.5 unity. While there exists more accurate tests like the Rockwell or Vickers test, the Mohs test is likely to be the most extensively used to characterize minerals, in particular pigments. On the other hand, it is not critical for the skilled person exploiting the present invention to be able to measure the hardness with a highly accurate method, given the sensitivity of the properties of the composition, in particular its gamma ray resistance, to the hardness. Thus, Mohs hardness values H, the accuracy of which is of about +/−0.5 units, are by far sufficient for the skilled in the art to discriminate in a sufficiently clear and complete manner, among all inorganic pigments, those which are suitable for use in the polymer composition (C) of the present invention. In addition, the Mohs hardness values H of a wide variety of pigments and other minerals is made available at http://www.mindat.org/, and the values herein reported can be considered as reference values for the purpose of the present invention.

Non limitative examples of inorganic pigments (IP) suitable for use in the present invention include:
  blue pigments such as azurite ($2\,CuCO_3.Cu(OH)_2$, n=1.73-1.84, H=3.5-4);
  green pigments such as β- and γ-malachites (n=1.88-1.91, H=3.5-4), pseudo-malachite (n=1.75-1.87, H=4-4.5), jarosite (n=1.71-1.82, H=2.5-3.5), and mixtures thereof;
  yellow pigments such as massicot (n=2.51-2.71, H=3.5-4), orpiment (n=2.40-3.02, H=1.5-2), natrojarosite (n=2.5-3.5, H=2.5-3.5), and mixtures thereof;
  red pigments such as realgar (n=2.54-2.70, H=1.5-2), vermillion or cinnabar (n=2.91-3.15, H=2-2.5), cerium sulfide (n=2.7, H=4) and mixtures thereof;
  white pigments;
and mixtures thereof.

Unless otherwise specified, when a range of value is provided for the refractive index n, this one corresponds to the range of values into which the refractive indexes corresponding to the multiple crystalline forms of the inorganic pigment (e.g. forms α, β, γ, or ε and ω) have been measured.

The inorganic pigment (IP) is preferably selected among white pigments. These pigments are typically characterized by the fact that their light-absorption is very small compared with their light scattering. Otherwise stated, these pigments absorb typically essentially no light in the visible region (wavelength 400-800 nm), but disperse incident radiation in this region as completely as possible.

Non-limitative examples of white pigments (IP) complying with both requisites stated above are:
  zinc sulfide, possibly crystallized in the sphalerite crystalline form (n=2.40-2.47, H=3.5) and/or in the wurtzite crystalline form (n=2.37, H=3) (to which preference is given) and/or in the matraite crystalline form; the zinc sulfide may originate from natural sources, notably as wurtzite, matraite, zinc blende, sphalerite including varieties known as cleiophane and cramerite; it may also be synthesized, alone or in blend with other substances, notably as sachtolith or lithopone, as detailed hereafter;
  mixtures consisting of between 75 and 100 wt. % of zinc sulfide (preferably mainly in the wurtzite crystalline form, "mainly" meaning that more than half of the weight, and generally much more, of the zinc sulfide is this crystalline form), between 0 and 25 wt. % of barium sulfate, and from 0 up to 5 wt. % of ingredients other than zinc sulfide and barium sulfate, in particular a mixture commonly referred to as sachtolith (n=2.37, H=3), which consists of between 95 and 100 wt. % (typically, about 98 wt. %) of zinc sulfide (mainly in the wurtzite crystalline form), between 0.3 and 3.0 wt. % of barium sulfate (typically, about 1.0 wt. %), between 0.01 wt. % and 1.0 wt. % of zinc oxide (typically, about 0.2 wt. %) and from 0 up to 2.0 wt. % (typically, about 0.8 wt. %) of ingredients other than zinc sulfide, barium sulfate and zinc oxide; as above mentioned, sachtolith is generally synthesized from zinc- and sulfur-containing raw materials (such as zinc crap or zinc oxide and crushed barite), and the synthesis method of sachtolith comprises typically dissolving fused barium sulfide in water, converting the barium sulfide in sodium sulfide by reacting it e.g. with sodium sulfate, mixing the sodium sulfide solution with a cobalt-treated zinc salt (e.g. zinc sulfate), and calcinating the resulting zinc sulfide (desirably in the presence of sodium chloride and sulfate) to achieve crystal growth; alternatively, crystal growth can be achieved by a hydrothermal process;
  mixtures comprising from 25 to 75 wt. % of zinc sulfide, from 25 to 75 wt. % of barium sulfate, and from 0 up to 5 wt. % of ingredients other than zinc sulfide and barium sulfate, in particular:
    (i) a mixture commonly referred to as red seal lithopone (n=2.01, H=3), which is a mixture consisting of from 25 to 35 wt. % zinc sulfide (typically about 29-30 wt. %), from 65 to 75 wt. % of barium sulfate, (typically about 70 wt. %), between 0.01 wt. % and 1.0 wt. % of zinc oxide (typically, about 0.1 wt. %) and from 0 up to 2.0 wt. % (typically, about 1.0 wt. %) of ingredients other than zinc sulfide, barium sulfate and zinc oxide; and
    (ii) a mixture commonly referred to as silver seal lithopone, which is a mixture consisting of from 57 to 67 wt. % zinc sulfide (typically about 60-63 wt. %), from 33 to 43 wt. % of barium sulfate, (typically about 37-40 wt. %), between 0.01 wt. % and 1.0 wt. % of zinc oxide (typically, about 0.1 wt. %) and from 0 up to 2.0 wt. % (typically, about 1.0 wt. %) of ingredients other than zinc sulfide, barium sulfate and zinc oxide;
  lithopones synthesized using a process similar to the process used to make sachtolith, except that barium sulfide is not converted into sodium sulfide but is reacted with the zinc salt (and possibly zinc chloride too) to form a mix of zinc sulfide, barium sulfate (and possibly barium chloride too):

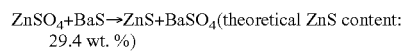

$ZnSO_4+BaS \rightarrow ZnS+BaSO_4$ (theoretical ZnS content: 29.4 wt. %)

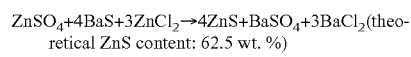

$ZnSO_4+4BaS+3ZnCl_2 \rightarrow 4ZnS+BaSO_4+3BaCl_2$ (theoretical ZnS content: 62.5 wt. %)

lead carbonate ($PbCO_3$) or cerussite (n=1.80-2.08, H=3-3.5);
  white lead ($2PbCO_3.Pb(OH)_2$) (n=1.94-2.09, H=3-3.5);
  lead sulfate (n=1.93, H=2.5-3);
  lead silicate (n=2.37, H=3);
  zinc white or zinc oxide (n=2.01, H=4);
  antimony trioxide $Sb_2O_3$ or valentinite (n=2.18-2.35, H=2.5-3);
and mixtures thereof.

Among all these pigments, zinc sulfide, sachtolith and lithopones, including read seal lithopone and silver seal lithopone, are preferred. Zinc sulfide, preferably in the wurtzite crystalline form, and sachtolith (wherein the zinc sulfide is mainly in the wurtzite crystalline form) are especially preferred. Excellent results were obtained with sachtoliths commercialized by Sachtleben, in particular with Sachteleben's SACHTOLITH HDS which is a synthetic, micronized, organically coated zinc sulfide.

The inorganic pigment (IP) consists usually of particles. The particles of the inorganic pigment (IP) are advantageously coated with an organic compound, such as a polymer, e.g. a polyamide.

The size of the particles of the pigment (IP) is conventionally selected in order to optimize the balance between their light-absorption, which should be low, and their light scattering, which should be high (see for instance Ullmann's Encyclopedia of Industrial Chemistry, Wiley-VCH editor, 5th edition, 1992, vol. A 20, p 257-290, the whole of which is herein incorporated by reference). Following these provisions, the number average diameter of the particles of the pigment (IP) is generally below 10 µm, preferably below 5 µm, and still more preferably below 0.8 µm. On the other hand, the number average diameter of the particles of the pigment (IP) is generally above 0.05 µm, preferably above 0.1 µm, and still more preferably above 0.15 µm.

The inorganic pigment (IP) is generally contained in the polymer composition (C) in an amount of at least 0.5 wt. %, preferably at least 1 wt. % and still more preferably at least 3 wt. %, based on the weight of the polymer composition (C). Besides, the inorganic pigment (IP) is generally contained in the polymer composition in an amount of at most 15 wt. %, preferably of at most 12 wt. % and still more preferably of at most 10 wt. %, based on the weight of the polymer composition (C).

The polymer composition (C) in accordance with the invention may further contain a variety of other polymers, additives, fillers other than the filler (F) in spherical, spheroidal or polyhedrical form, collectively called ingredients herein. Among these other fillers, calcium carbonate, calcium sulfate, barium sulfate, glass beads, ceramic beads, antimony trioxide, zinc borate, etc. can be cited.

Other optional conventional ingredients of the composition (C) include nucleating agent such silica, adhesion promoters, compatibilizers, curing agents, lubricants, mold release agents, dyes and colorants, smoke-suppressing agents, heat stabilizers, antioxidants, UV absorbers, tougheners such as rubbers, plasticizers, anti-static agents, melt viscosity depressants such as liquid crystalline polymers, and the like.

It may be advantageous to further incorporate in the polymer composition (C) at least one hindered amine light stabilizer ("HALS"). Examples of such HALS are (2,2,6,6-tetramethylpiperidyl) sebacate, (2,2,6,6-tetramethylpiperidyl-) succinate, condensate of 1-hydroxyethyl-2,2,6,6-tetramethyl-4-hydroxypiperidine and succinic acid, condensate of N,N'-bis(2,2,6,6-tetramethyl-1-4-piperidyl)hexamethylenediamine and 4-tert-octylamino-2,6-dichloro-1,3,-5-s-triazine, tris(2,2,6,6-tetramethyl-4-piperidyl) nitrilotriacetate, tetrakis(2,2,6,6-tetramethyl-4-piperidyl) 1,2,3,4-butanetetraoate, 1,1'-(1,2-ethanediyl)-bis(3,3,5,5-tetramethylpiperazinone), 4-benzoyl-2,2,6,6-tetramethylpiperidine, 4-stearyloxy-2,2,6,6-tetramethylpiperidine, to (1,2,2,6,6-pentamethylpiperidyl) 2-n-butyl-2-(2-hydroxy-3,5-di-tert-butylbenzyl)malonate, 3-n-octyl-7,7,9,9-tetramethyl-1,3,8-triazas-piro[4.5]decane-2,4-dione, to (1-octyloxy-2,2,6,6-tetramethylpiperidyl) sebacate, (1-octyloxy-2,2,6,6-tetramethylpiperidyl) succinate, condensate of N,N'-bis(2,2,6,6-tetramethyl-4-piperidyl) hexamethylenediamine, and the like. The HALS may be incorporated in the composition (C) in conventional amounts, generally higher than 0.05 wt. % and preferably higher than 0.1 wt. %; further, these amounts are generally lower than 5 wt. % and preferably lower than 1 wt. %.

The essential components (PA), (F) and (IP) of the composition (C) along with the said optional additional ingredients may be incorporated into the semi-aromatic polyamide (PA) by a variety of different methods and procedural steps which aim to provide their thorough mixture. For example, it is possible to incorporate the above mentioned components and optional additional ingredients by mixing them into the polymer at an early stage: at the start or at the end of the (co)polycondensation of the semi-aromatic polyamide, or in a subsequent compounding process. A certain method comprises dry mixing the essential components and optional ingredients in powder or granular form, in appropriate proportions, using e.g. a mechanical blender, such as a drum blender and the like. The mixture is then melted batchwise or in a continuous device, like extruders and the like, extruding the mixture into strands and chopping the strands into pellets. The mixture to be melted may also be prepared by well known masterbatch methods. The continuous melting device may also be fed with the components and ingredients of the composition (C) added separately without dry premixing.

A certain other method comprises dissolving the polymer(s) (PA) in one or more organic solvents (or dissolving the said polymer(s) in an organic solvent, then causing the dissolved polymer(s) to precipitate by the addition of a non solvent, and finally molding the recovered dried cake).

Another aspect of the present invention is directed to a polymer composition comprising:
at least one semi-aromatic polyamide (PA), preferably a PMXD6 polymer,
at least one filler selected from talc, mica, kaolin, kaolinite, mullite, clay, wollastonite, xonotlite, sepiolite, attapulgite, palygorskite, glass fiber, asbestos, synthetic polymeric fiber, aramid fiber, aluminum fiber, titanium fiber, magnesium fiber, aluminum silicate fiber, silicium carbide fiber, boron carbide fiber, rock wool fiber, steel fiber and whiskers, and mixtures thereof, preferably glass fiber, and
at least one inorganic pigment selected from zinc sulfide, azurite, β-malachite, γ-malachite, pseudo-malachite, jarosite, massicot, orpiment, natrojarosite, realgar, vermillion, cinnabar, zinc sulfide, zinc sulfide crystallized in the cubic system, zinc sulfide crystallized in the hexagonal system, wurtzite, matraite, sphalerite, blende, cleiophane, cramerite, sachtolith, lithopone, red seal lithopone, silver seal lithopone, lead carbonate, cerussite, white lead, lead sulfate, lead silicate, zinc oxide, antimony trioxide, antimony trioxide, valentinite, and mixtures thereof, preferably zinc sulfide (preferably in the wurtzite crystalline form) and sachtolith (wherein the zinc sulfide is mainly in the wurtzite crystalline form).

In accordance with this aspect of the present invention, the polymer composition meets advantageously all the features of the polymer composition (C) as above described, the filler meets advantageously all the features of the filler (F) as above described, and the inorganic pigment meets advantageously all the features of the inorganic pigment (IP) as above described. The semi-aromatic polyamide (PA) is the one as above described when discussing about the polymer composition (C).

A particular embodiment of the present invention is directed to a gamma radiation sterilizable polymer composition comprising a PMXD6 polymer, glass fiber and zinc sulfide, in particular in its wurtzite form.

The present invention also relates to a shaped article or a part of a shaped article comprising the polymer composition (C).

The shaped article according to the invention is advantageously a medical device, and preferably one which has to be or has been sterilized by using gamma radiations. ISO standard 11137 provides information for determining the radiation doses to be used to sterilize these devices. Herein, the terms "medical device" should be understood in its broadest meaning: the medical devices in accordance with the present invention encompass not only (i) those non surgical devices useful for treating or alleviating the symptoms of disease, but also notably (ii) those medical devices useful in a patient's treatment in which the patient's body is cut open by a surgeon in order to treat or remove the problem part (known as "surgical devices"), in particular those devices useful for treating or alleviating the disorders of the bones and joints (known as "orthopedic devices"), possibly by inserting implants, including said implants themselves, as well as (iii) those devices useful in dentistry, in particular those devices useful for correcting the irregularities of the teeth (known as "orthodontic devices"), and (iv) those medical devices useful for preventing or diagnosing diseases.

Generally, on an industrial scale, these doses are comprised from 15 to 70 kGray (kGy), preferably from 20 to 40 kGy.

Sterilizable medical devices which can be shaped from the composition (C) in accordance with the invention can be chosen from surgical tools and orthopedic tools. Examples of such sterilizable medical devices include:

awls, especially bone awls;
traction bows;
blades;
broaches such as hip broaches;
catheters;
chisels;
clips;
clamps such as bone clamps and cartilage clamps;
cutters such as wire cutters and pin cutters;
curettes, especially bone curettes;
dissectors;
drills such as hand drills and pattern drills;
elevators such as bone elevators and periosteal elevators;
wire extractors;
knee alignment fixations,
forceps, such as dressing or tissue forceps (including Graefe forceps, Iris forceps and Adson forceps), applying forceps (including applying forceps for approximators, reflex clip appliers and reflex clip removing forceps), microforceps, bone cutting or holding forceps, sequestrum forceps and tendon pulling forceps;
guides such as saw guides and wire guides;
gouges;
lead hands;
handles such as saw handles;
haemostats, such as Rochester-Oschner haemostatic forceps, Rochester-Pean haemostatic forceps, Backhaus towel clamps and Mosquito haemostatic forceps;
holders such as mesh holders and needle holders;
hooks;
implants;
instruments and ancillaries used to remove bones for hip or knee prosthetic surgery;
knives such as scalpels, microsurgical knives, ophthalmic knives, amputating knives, cartilage knives and meniscus knives;
mallets, instrument portfolios, and the like;
osteotomes;
Steinmann pins such as fully threaded Steinmann pins and smooth Steinmann pins;
pliers, such as Fishermen's pliers, scissors pliers and needle nose pliers;
probes and trials, such as femoral knee trials;
tip protectors,
pullers such as pin pullers and wire pullers;
punches;
rasps, such as hip rasps, raspatories, rugines and scalprums;
retrievers such as tendon retrievers;
retractors such as bone retractors, hand retractors, finger retractors, hook retractors, knee retractors, meniscus hook retractors and rake retractors;
rongeurs such as bone rongeurs and duckbill rongeurs;
saws, especially bone saws;
scissors such as cartilage scissors;
skids such as bone skids;
speculums such as Knapp speculums,
surgical staplers,
strippers such as tendon strippers;
wire tighteners;
trays;
trephines;
tweezers, such as Dumont tweezers (e.g. Dumont #5 tweezers);
wire twisters;
wires such as Kirschner wires (e.g. fully threaded or smooth Kirschner wires) and orthodontic wires.

As the polymer composition (C) can be shaped into various medical articles, it is preferably biocompatible. Thus, a particular aspect of the present invention lies in the surprisingly good biocompatibility [in accordance with United States Pharmacopeia (USP) Class VI and ISO 10993 standard] of certain preferred semi-aromatic polyamides suitable for use as the semi-aromatic polyamide (PA) included in the invented polymer composition (C), namely the PMXD6 polymers. The Applicant has further found the good biocompatibility of the PMXD6 polymers biocompatibility (in accordance with both USP Class VI and ISO 10993) was not affected by lots of additives suitable for use in the polymer composition (C), including glass fibers and nylon 6,6. Thus, a particular aspect of the present invention concerns the use of a PMXD6 polymer (or, of the polymer composition (C)—as above described—wherein the semi-aromatic polyamide (PA) is a PMXD6) for its biocompatibility, in particular for its compliance with United States Pharmacopeia (USP) Class VI standard, and/or for its compliance with ISO 10993 standard. Generally, the test methods used under ISO 10993 include ISO 10993:5: 1999 (cytotoxicity using the ISO elution method), ISO10993:10: 2002 (maximization sensitization with sodium chloride extract and sesame oil extract, and intracutaneous reactivity with sesame oil extract), ISO 10993:11: 1993 (systemic toxicity study with sodium chloride extract and sesame oil extract), and ISO 10993:18: 2005 (physico-chemical testing with water extract). Preferably, the invented use concerns the use of the PMXD6 polymer (or, of the polymer composition (C)—as above described—wherein the semi-aromatic polyamide (PA) is a PMXD6), for its biocompatibility (in particular, for its compliance with USP Class VI and/or ISO 10993 standards) in a medical application which requires using a material which is biocompatible (in particular, in a medical application which requires using a material which is compliant with USP Class VI and/or ISO 10993 standards).

The shaped article according to the invention is advantageously formed by molding. Various molding techniques may be used to form shaped articles or parts of shaped articles from the composition (C). Powders, pellets, beads, flakes, reground material or other forms of the composition (C) may be molded, with or without liquid or other additives, premixed or fed separately. In particular embodiments, the composition (C) may be compression molded. Exact conditions may be determined by trial and error molding of small samples. Upper temperature limits may be estimated from thermal analysis such as thermogravimetric analysis. Lower temperature limits may be estimated from Tg as measured for example by dynamic mechanical thermal analysis (DMTA), differential scanning calorimetry (DSC), or like methods. The composition (C) can be injection molded. One skilled in the art will recognize the factors influencing injection moldability including the material's stress relaxation properties and the temperature dependence of melt viscosity.

The composition (C) can also be extruded. Non-limiting examples include angle, channel, hexagonal bar, hollow bar, 1-beam, joining strip, tubes, rectangular tube, rod, sheet, plate, square bar, square tube, T-section, thin-walled tubes, microtubes, strands, rectangular strands, or other shapes as is required for a particular application. Related to extrusion is pultrusion, wherein a fiber reinforcement, such as glass or carbon fiber, is continuously added to a matrix of extruded composition (C) at molten state; composites with exceptional moduli and compressive strength will result.

Another aspect of the present invention concerns the use of at least one inorganic pigment (IP) having a Mohs hardness of at most 4.5 and a refractive index of at least 1.70 for increasing the resistance to gamma rays of a material, said material being a polymer (P) having a heat deflection temperature of above 80° C. under a load of 1.82 MPa when measured according to ASTM D648 or a polymer composition comprising at least one polymer (P) as previously defined. The polymer (P) is advantageously a semi-aromatic polyamide (PA). The material is advantageously a polymer composition comprising at least one semi-aromatic polyamide (PA) and at least one filler (F) selected from platy fillers, acicular fillers and fibrous fillers. The material may be exposed to a gamma ray dose of from 3 to 300 kGray. The material may be comprised in a shaped article or part of a shaped article, such as those above described.

As well known to the skilled person, exposing a material to gamma rays can notably result in a discoloration and/or in a loss of mechanical properties and/or in a loss of chemical resistance of said material. Thus, the resistance to gamma rays of a material can notably be viewed as increased by the use of a pigment, when the color shift caused by the exposure of the material to gamma radiation is decreased as the result of the use of said pigment. As shown in the examples, the overall color shift can be quantified notably in terms of ΔE, wherein ΔE is understood to mean that the overall colorimetric difference in the HUNTERLAB space:

$$\Delta E = \sqrt{(L_\gamma - L_0)^2 + (a_\gamma - a_0)^2 + (b_\gamma - b_0)^2}$$

between the color of the polymer composition (C) after exposure to gamma rays and that of the same polymer composition (C) before exposure to gamma rays, L is the luminance, a is the chromaticity along the green-red axis and b is the chromaticity along the yellow-blue axis; in the above relation, the index $_\gamma$ under L, a and b refers the polymer composition (C) after exposure to gamma rays, while the index $_0$ refers to the same polymer composition (C) before it has been exposed. The calculation of ΔE can be made using illuminant "D-65" and 2-degree observer, with specular reflectance included.

Typical heat deflection temperatures of certain polymers (P) are listed in the table below.

| Polycondensation Polymer | Heat Deflection Temp. (° C.) |
|---|---|
| Bisphenol A polysulfone | 174 |
| Polyethersulfone | 203 |
| Polyphenylsulfone | 204 |
| Polyphthalamide | 120 |
| Polyamideimide | 278 |

-continued

| Polycondensation Polymer | Heat Deflection Temp. (° C.) |
|---|---|
| Liquid crystalline polymer (LCP) (there are several different conventional LCPs) | 180-310 |
| Polyimide | 360 |
| Polyetherimide | 200 |
| Polyetheretherketone (low flow) | 160 |
| Polyetheretherketone (high flow) | 171 |
| Polyphenylene sulfide | 135 |
| Polycarbonate | 132 |

Heat deflection temperatures (HDT) are determined according to ASTM D648, Method A, using a span of 4 inches. The polymer (P) is injection molded into plaques that are 5 inches long, ½ inch wide, and ⅛ inch thick. The plaques are immersed in a suitable liquid heat-transfer medium, such as an oil, during the HDT test. Dow Corning 710 silicone oil, for example, is used for semi-aromatic polymers. The HDT test is performed on unannealed specimens.

In certain embodiments of the present invention, the polymer (P) may be selected from polysulfone, polyphenylsulfone, polyethersulfone, polyetherethersulfone, and blends and copolymers thereof. The structural repeat units of polyphenylsulfone, polysulfone, polyethersulfone, and polyetherethersulfone are listed below:

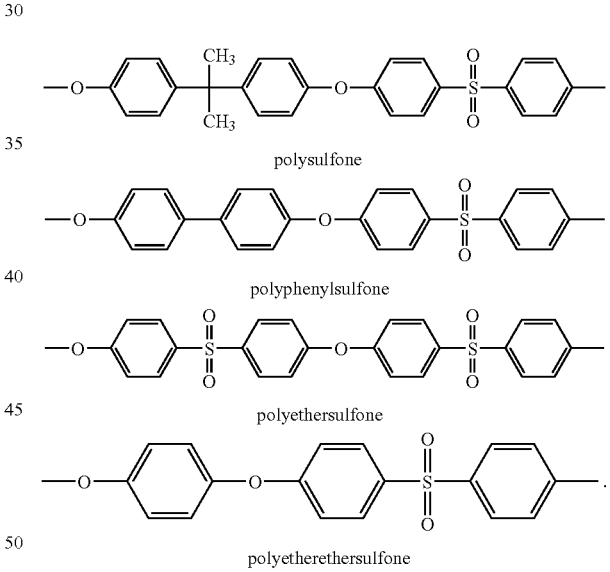

In certain other embodiments of the present invention, the polymer (P) may be selected from polyetherketone, polyetheretherketone, polyetherketoneketone, and blends and copolymers thereof.

The structural repeat units of polyetherketone, polyetheretherketones, polyetherketoneketones are listed below:

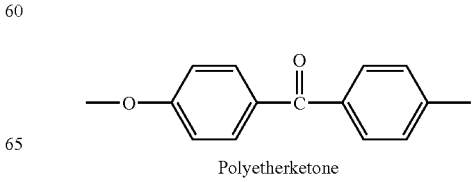

Polyetherketone

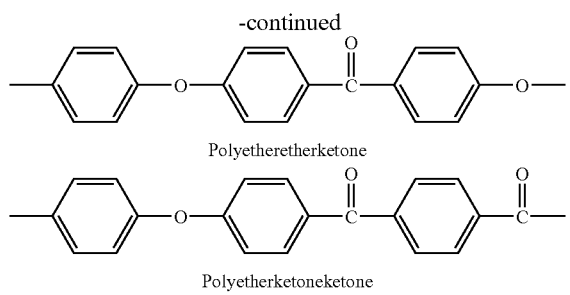

Polyetheretherketone

Polyetherketoneketone

In still another embodiments of the present invention, the polymer (P) is polyphenylene sulfide.

Still another aspect of the present invention concerns the use of zinc sulfide for increasing the resistance to gamma rays of a material, said material being a polymer composition comprising at least one semi-aromatic polyamide (PA) and glass fiber. The material may be exposed to a gamma ray dose of from 3 to 300 kGray. The material may be comprised in a shaped article or part of a shaped article, such as those above described.

Still another aspect of the present invention concerns a method for increasing the resistance to gamma rays of a material in the need thereof, said material being a polymer (P) having a heat deflection temperature of above 80° C. under a load of 1.82 MPa when measured according to ASTM D648 or a polymer composition comprising at least one polymer (P) as previously defined, said method comprising adding to the material a gamma ray stabilizing amount of at least one inorganic pigment (IP) having a Mohs hardness of at most 4.5 and a refractive index of at least 1.70. The polymer (P) is advantageously a semi-aromatic polyamide (PA). The material is advantageously a polymer composition comprising at least one semi-aromatic polyamide (PA) and at least one filler (F) selected from platy fillers, acicular fillers and fibrous fillers. The material may be exposed to a gamma ray dose of from 3 to 300 kGray. The material may be comprised in a shaped article or part of a shaped article, such as those above described.

Still another aspect of the present invention concerns a method for increasing the resistance to gamma rays of a material in the need thereof, said material being a polymer composition comprising at least one semi-aromatic polyamide (PA) and glass fiber, said method comprising adding to the material a gamma ray stabilizing amount of zinc sulfide. The material may be exposed to a gamma ray dose of from 3 to 300 kGray. The material may be comprised in a shaped article or part of a shaped article, such as those above described.

Still another aspect of the present invention concerns the use of at least one pigment having a Mohs hardness of at most 6.5 and a refractive index of at least 1.40 for increasing the resistance to gamma rays of a material, said material being a polymer (P) having a heat deflection temperature of above 80° C. under a load of 1.82 MPa when measured according to ASTM D648 or a polymer composition comprising at least one polymer (P) as previously defined. The pigment of concern may be organic or inorganic; it is preferably inorganic. Although not preferred, the pigment of concern may have a refractive index of from 1.40 to less than 1.70; non-limitative examples of pigments having a refractive index of from 1.40 to less than 1.70 include barium sulfate (n=1.63), ultramarine blue (n=1.51), chloro-copper phthalocyanine (also known as phthalocyanine green, n=1.40). Alternatively and preferably, the pigment of concern has a refractive index of at least 1.70, more preferably of at least 1.90, still more preferably of at least 2.10 and the most preferably of at least 2.30; while this does not generally represent a preferred feature of the pigment of question, it can be noted that its refractive index is usually below 4.00, very often below 3.50 and often below 3.00. Also, although not preferred, the pigment of concern may have a Mohs hardness of above 4.5, up to 6.5; non-limitative examples of pigments having a refractive index of at least 1.70 and a Mohs hardness of above 4.5 include titanium dioxide [including rutile titanium dioxide (n: 2.80, H=6-6.5), anatase titanium dioxide (n: 2.55, H=5.5-6), and mixtures thereof, with rutile titanium dioxide being preferred], zirconium dioxide or baddeleyite (n: 2.13-2.20, H=6.5), and iron oxide red or haematite (n: 2.78-3.01, H ranges from 5 to 6). Alternatively and preferably, the pigment of concern has a Mohs hardness of at most 4.5, and, very preferably, the pigment is an inorganic pigment having a Mohs hardness of at most 4.5 and a refractive index of at least 1.70, as the above described inorganic pigment (IP). The polymer (P) is advantageously a semi-aromatic polyamide (PA). The material is advantageously a polymer composition comprising at least one semi-aromatic polyamide (PA) and at least one filler (F) selected from platy fillers, acicular fillers and fibrous fillers. The material may be exposed to a gamma ray dose of from 3 to 300 kGray. The material may be comprised in a shaped article or part of a shaped article, such as those above described; for example, the shaped article may be an orthopedic tool and a specific aspect of the present invention may be directed to the use of the pigment of concern for increasing the resistance to gamma rays of an orthopedic tool consisting essentially of, or comprising at least one part consisting essentially of, at least one plastic material, wherein the plastic material comprises at least one semi-aromatic polyamide comprising more than 50 mole % of recurring units obtained by the polycondensation reaction between at least one aliphatic diacid or derivative thereof and at least one aromatic diamine.

Still another aspect of the present invention concerns the use of at least one pigment for increasing the resistance to gamma rays of a material, said material being a polymer composition comprising at least one semi-aromatic polyamide (PA) and at least one filler, said filler being selected from platy fillers, acicular fillers and fibrous fillers, and said pigment being selected from zinc sulfide, azurite, β-malachite, γ-malachite, pseudo-malachite, jarosite, massicot, orpiment, natrojarosite, realgar, vermillion, cinnabar, zinc sulfide, zinc sulfide in the wurtzite crystalline form, zinc sulfide in the sphalerite crystalline form, wurtzite, matraite, sphalerite, blende, cleiophane, cramerite, sachtolith, lithopone, red seal lithopone, silver seal lithopone, lead carbonate, cerussite, white lead, lead sulfate, lead silicate, zinc oxide, antimony trioxide, antimony trioxide, valentinite, barium sulfate, ultramarine blue, phthalocyanine green, titanium dioxide, rutile titanium dioxide, anatase titanium dioxide, zirconium dioxide, and iron oxide red, and mixtures thereof. The pigment is preferably selected among the pigments in the above list starting from "zinc sulfide" to "valentinite", and mixtures thereof. It is very preferably chosen from zinc sulfide, lithopone and sachtolith.

A last aspect of the present invention deals with the excellent colorability and retention of color after exposure to gamma rays of the presently invented medical devices, especially those made out of reinforced polymer compositions comprising a PMXD6 polymer. The surgeon or other medical practitioner, when treating a patient, often needs to use a high number of medical devices having a very close appearance or, otherwise said, differing only from each other by one or more features which is uneasy to catch rapidly with the eyes. For example, for a single orthopedic operation, the surgeon may need up to 10-15 different hip rasps differing only from each other by their size. It is highly desirable that the medical practitioner be able to distinguish quickly and easily between a high number of medical devices of close visual appearance, which one has to be used at a given time of the medical act (e.g. an orthopedic operation). The medical devices in accordance with the present invention make this possible because, as the result of their excellent colorability and color retention after exposure to gamma rays, different medical devices of close visual appearance can be quite easily colored in substantially different colors, and with a broad set of color palettes being easily accessible; further, their color is kept weakly changed over time, even after numerous exposures to gamma rays. With this regard, the invention can also be viewed as the use of a criterion based on the color of a medical device (in particular, an orthopedic tool) consisting essentially of, or comprising at least one part consisting essentially of, a gamma radiation sterilizable polymer composition comprising at least one semi-aromatic polyamide (PA) and at least one pigment having a Mohs hardness of at most 6.5 and a refractive index of at least 1.40 [preferably, the gamma radiation sterilizable, reinforced polymer composition (C) as above described], for selecting said medical device among a plurality of medical devices differing from each other at least by their color, possibly mainly or essentially by their color; in a particular embodiment, the plurality of medical devices (in particular, the plurality of orthopedic tools) comprises, or consists of, medical devices having the same functionality (e.g all the medical devices are hip rasps), preferably it consists of essentially homothetic, or even homothetic, medical devices having the same functionality. The selection takes often place during the course of a medical act (e.g. an orthopedic operation), i.e. when the medical practitioner is treating a patient.

The present invention is described in greater detail below by referring to the non limitative examples.

EXAMPLES 1R AND 2

Example 1R is Given for Comparative Purposes

In accordance with example 1R, a first sample was molded from a composition composed of:
 44 wt. % of PMXD6 polymer;
 50 wt. % of "EC-10-4.5 mm-983" glass fiber;
 4.9 wt. % of a nylon 66;
 1 wt. % talc;
 0.1 wt. % Ca Stearate.

These ingredients were melt-compounded using a ZSK 30 extruder, with the glass fiber fed via side feeding. All other materials were fed via the main hopper. The temperature was set a 270° C. The throughput was 20 kg/h at 300 rpm.

Said molded first sample was then injection molded using a Battenfeld 350/125CD 25 mm screw equipped with Axxicon ISO mould at an injection speed of 200 mm/s, at a temperature of 270° C. and an hydraulic holding pressure of 40 bar, so as to obtain injection molded sample 1R.

A 40 kGy gamma irradiation was performed on sample 1R using a Gammacell-220 by and at Griffith Merdiris.

The flexural strength of the sample 1R was determined before and after the gamma irradiation following standard ISO 178, using an Instron 4444 series equipment.

The color of the sample 1R before and after the gamma irradiation was measured on a spectrometer. The degree of color change was quantified as the total color difference (delta E), calculated in all cases for illuminant "D-65" and a 2-degree observer, specular included, expressed in HUNTER-LAB units. A HUNTERLAB® XE spectrophotometer equipped with a D65 lightning, and with a 2° observer angle was used to this purpose. The color was determined including the specular reflectance.

Example 2 is in Accordance with the Present Invention

In accordance with example 2, a second sample was molded from a composition composed of:
 35 wt. % of PMXD6 polymer;
 50 wt. % of E-type chopped glass fibers, having a nominal average diameter of 10 µm (before compounding) and a nominal number average length of 4.5 mm (before compounding), sized with a polyamide;
 4.9 wt. % of nylon 66;
 1 wt. % talc;
 0.1 wt. % Ca Stearate, and
 9 wt. % of sachtolith, commercialized by Sachtleben as SACHTOLITH® HDS.

Melt-compounding took place in the same conditions as those used for the first sample of example 1R.

Said molded second sample was injection molded and gamma irradiated in the same way as sample 1R, so as to obtain injection molded sample 2.

The flexural strength and color shift of sample 2 were tested in the same way as described for sample 1R.

The results of the tests conducted on samples 1R and 2 are collected in Table 1 hereunder.

TABLE 1

| Sample | Example 1R 1R | Example 2 2 |
|---|---|---|
| Flexural strength before gamma irradiation (MPa) | 393 | 358 |
| Flexural strength after gamma irradiation (MPa) | 387 | 351 |
| % Retention in flexural strength after gamma irradiation | 98% | 98% |
| Deformation at break before gamma irradiation (%) | 2.44 | 2.08 |
| Deformation at break after gamma irradiation (%) | 2.40 | 2.09 |
| % Retention of deformation at break after gamma irradiation (%) | 98% | 100% |
| Color difference after gamma irradiation - Delta E | 29.8 | 9.0 |

These results showed the favorable effect of the addition of the zinc sulfide-based pigment on the properties of the sample molded with a gamma irradiated composition in accordance with the invention: the mechanical properties are essentially not affected by the presence of the zinc sulfide-based pigment, and are thus maintained at a very acceptable level; meanwhile, the color shift is dramatically decreased compared to that of the comparative sample.

EXAMPLES 3 TO 7

Samples were molded from compositions composed of:
 42.7 wt. % of PMXD6 polymer;
 48.5 wt. % of E-type chopped glass fibers, having a nominal average diameter of 10 µm (before compounding) and a nominal number average length of 4.5 mm (before compounding), sized with a polyamide;

4.8 wt. % of nylon 66;
1 wt. % talc;
0.1 wt. % Ca Stearate, and
2.9 wt. % of an inorganic pigment.

The samples differed from each other only by the nature of the inorganic pigment:
for example 3, barium sulfate (Blanc fixe F) was used;
for example 4, rutile titanium dioxide Kronos® 2450 was used;
for example 5, anatase titanium dioxide Kronos® 1014 was used;
for example 6, red seal lithopone commercially available as Lithopone-30DS was used;
for example 7, sachtolith commercially available as Sachtolith® HDS was used.

They differ from the sample of example 1R, in that they further contain 3 parts by weight of the inorganic pigment, per 100 parts of the composition of sample 1R. Otherwise said, the compositions 3 to 7 may also be viewed as being composed of:
100 parts by weight of the sample of example 1R, and
3 parts by weight of the inorganic pigment.

Melt-compounding took place in the same conditions as those used for the first two samples of examples 1R and 2.

The presently molded samples were injection molded and gamma irradiated in the same way as samples 1R and 2, so as to obtain injection molded samples 3 to 7.

The flexural strength and color shift of samples 3 to 7 were tested in the same way as described for samples 1R and 2.

The % retention in flexural strength and color shifts (delta E) of these samples after gamma irradiation are collected in Table 2.

It has also been calculated the % retention in flexural strength resulting from the incorporation of the pigment to the pigment-free composition of sample 1 (absent gamma irradiation).

TABLE 2

| | Example | | | | |
|---|---|---|---|---|---|
| | 3 | 4 | 5 | 6 | 7 |
| | Sample | | | | |
| | 3 | 4 | 5 | 6 | 7 |
| Pigment incorporated | Barium sulfate (Blanc fixe F) | Titanium dioxide (rutile) (Kronos ® 2450) | Titanium dioxide (anatase) (Kronos ® 1014) | Red Seal Lithopone (Lithopone-30DS) | Sachtolith (Sachtolith ® HDS) |
| Refractive index n | 1.63 | 2.80 | 2.55 | 2.01 | 2.37 |
| Mohs hardness H | 3.5 | 6-6.5 | 5.5-6 | 3 | 3 |
| % Retention in flexural strength after pigment incorporation[1] | 96% | 67% | 68% | 99% | 95% |
| % Retention of deformation at break after pigment incorporation[1] | 97% | 66% | 67% | 99% | 94% |
| % Retention in flexural strength after gamma irradiation[2] | 92% | 94% | 92% | 90% | 98% |
| % Retention of deformation at break after gamma irradiation[2] | 92% | 92% | 90% | 90% | 98% |
| (L, a, b) before gamma irradiation[3] | (77, −4.3, 4.0) | (89, −0.9, 1.3) | (91, −1.2, 1.1) | (87, −2.6, 2.6) | (89, −1.9, 2.3) |
| Delta L after gamma irradiation | 18 | 4.0 | 6.1 | 11 | 7.0 |
| Delta a after gamma irradiation | 2.2 | 1.3 | 1.3 | 1 | 1.5 |
| Delta b after gamma irradiation | 23 | 10 | 13 | 21 | 16 |
| Overall color difference after gamma irradiation - Delta E | 29 | 11 | 15 | 24 | 18 |

[1] = Flexural strength (or deformation at break) of the sample of concern divided by the flexural strength (or deformation at break) of reference sample 1
[2] = Flexural strength (or deformation at break) of the sample of concern after irradiation divided by the flexural strength (or deformation at break) of the same sample before irradiation
[3] L, a and b of sample 1 before irradiation are respectively of 71, −3.2 and 1.7.

From these results show that, it can be seen that, unexpectedly, a very good overall balance of properties (in terms of retention of mechanical properties after pigment incorporation, retention of mechanical properties after gamma irradiation and color retention after gamma irradiation) was obtained with the compositions containing red seal lithopone (ex. 6) or sachtolith (ex. 7), the best overall balance of properties being obtained with the sachtolith-containing composition.

These results show further that, surprisingly, the incorporation of a pigment to the PMXD6 composition resulted in an important increase of the resistance to gamma rays (please compare e.g. the overall color difference after gamma irradiation Delta E for unpigmented sample 1R and samples 2 to 7 which were pigmented with a pigment having a refractive index of 1.63 or more); further, the higher the refractive index is, the higher the gamma ray resistance (the lower the Delta E).

These results show further that, among all the tested pigments, those having the lowest Mohs hardness values (nl. sachtolith and lithopone) provided surprisingly the best results in terms of retention of mechanical properties (e.g. flexural strength and deformation at break) after pigment incorporation. On the other hand, with pigments like titanium dioxides, the level of mechanical properties was caused to decrease substantially. Thus, such pigments should be advantageously used only in applications not demanding mechanical properties at a very high level, possibly with the intent of rendering the composition more cost attractive.

The invention claimed is:

1. A gamma radiation sterilizable polymer composition (C) comprising:
    at least one semi-aromatic polyamide (PA) essentially all the recurring units of which are obtained by the polycondensation reaction of adipic acid and meta-xylylene diamine,
    at least one filler (F) selected from the group consisting of platy fillers, acicular fillers and fibrous fillers, and
    at least one inorganic pigment (IP) having a Mohs hardness of at most 4.5 and a refractive index of at least 1.70.

2. The polymer composition according to claim 1, wherein the difference between the Mohs Hardness H of the filler (F) and the Mohs hardness H of the inorganic pigment (IP) [$H_{filler\,(F)} - H_{pigment\,(IP)}$] is of at least +2.

3. The polymer composition according to claim 1, wherein the inorganic pigment (IP) has a refractive index of at least 1.90.

4. The polymer composition (C) according to claim 1, wherein the filler (F) is selected from the group consisting of talc, mica, kaolin, kaolinite, mullite, clay, wollastonite, xonotlite, sepiolite, attapulgite, palygorskite, glass fiber, asbestos, synthetic polymeric fiber, aramid fiber, aluminum fiber, titanium fiber, magnesium fiber, aluminum silicate fiber, silicium carbide fiber, boron carbide fiber, rock wool fiber, steel fiber, whiskers, and mixtures thereof.

5. The polymer composition (C) according to claim 4, wherein the filler (F) is glass fiber.

6. The polymer composition (C) according claim 1, wherein the inorganic pigment (IP) is selected from the group consisting of zinc sulfide, azurite, β-malachite, γ-malachite, pseudo-malachite, jarosite, massicot, orpiment, natrojarosite, realgar, vermillion, cinnabar, zinc sulfide in the wurtzite crystalline form, zinc sulfide in the sphalerite crystalline form, wurtzite, matraite, sphalerite, blende, cleiophane, cramerite, sachtolith, lithopone, red seal lithopone, silver seal lithopone, lead carbonate, cerussite, white lead, lead sulfate, lead silicate, zinc oxide, antimony trioxide, and mixtures thereof.

7. The polymer composition according to claim 6, wherein the inorganic pigment (IP) is selected from the group consisting of zinc sulfide, lithopone, and sachtolith.

8. The polymer composition according to claim 7, wherein the inorganic pigment (IP) is zinc sulfide in the wurtzite crystalline form, or the inorganic pigment (IP) is sachtolith comprising zinc sulfide, wherein more than half of the weight of the zinc sulfide is in the wurtzite crystalline form.

9. A gamma radiations sterilized medical device comprising the polymer composition (C) according to claim 1.

10. The gamma radiations sterilized medical device according to claim 9, being a surgical tool or an orthopedic tool.

11. A method for increasing the resistance to gamma rays of a material, comprising adding at least one pigment to the material,
    said material being a polymer composition comprising at least one semi-aromatic polyamide (PA) essentially all the recurring units of which are obtained by the polycondensation reaction of adipic acid and meta-xylylene diamine and at least one filler,
    said filler being selected from the group consisting of platy fillers, acicular fillers, and fibrous fillers, and
    said pigment being selected from the group consisting of zinc sulfide, azurite, β-malachite, γ-malachite, pseudo-malachite, jarosite, massicot, orpiment, natrojarosite, realgar, vermillion, cinnabar, zinc sulfide in the wurtzite crystalline form, zinc sulfide in the sphalerite crystalline form, wurtzite, matraite, sphalerite, blende, cleiophane, cramerite, sachtolith, lithopone, red seal lithopone, silver seal lithopone, lead carbonate, cerussite, white lead, lead sulfate, lead silicate, zinc oxide, antimony trioxide, antimony trioxide, valentinite, barium sulfate, ultramarine blue, phthalocyanine green, rutile titanium dioxide, anatase titanium dioxide, zirconium dioxide, iron oxide red, and mixtures thereof.

12. The method according to claim 11, wherein the pigment is selected from the group consisting of zinc sulfide, lithopone, and sachtolith.

13. The method according to claim 11, wherein the pigment is at least one inorganic pigment (IP) having a Mohs hardness of at most 6.5 and a refractive index of at least 1.40.

14. The method according to claim 11, wherein the pigment is at least one inorganic pigment (IP) having a Mohs hardness of at most 4.5 and a refractive index of at least 1.70.

15. The method according to claim 11, wherein the pigment is at least one inorganic pigment (IP) having a refractive index of at least 1.90.

* * * * *